June 20, 1950  G. PLATT ET AL  2,511,940
FIELD CREEPER
Filed March 28, 1947  2 Sheets-Sheet 1
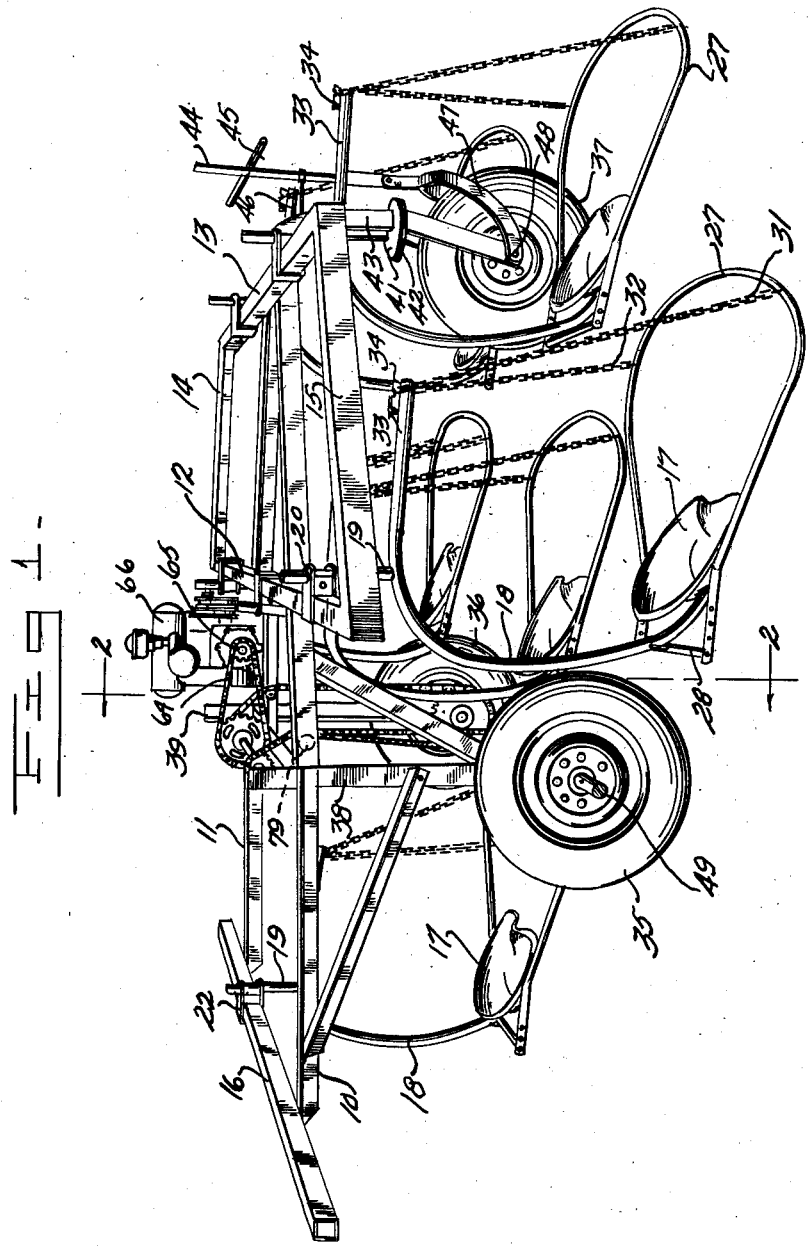
INVENTOR.
GARRETT PLATT
EMERSON PLATT
BY
*Mc Morris, Bruner & Davidson*
ATTORNEYS June 20, 1950 G. PLATT ET AL 2,511,940
FIELD CREEPER
Filed March 28, 1947 2 Sheets-Sheet 2
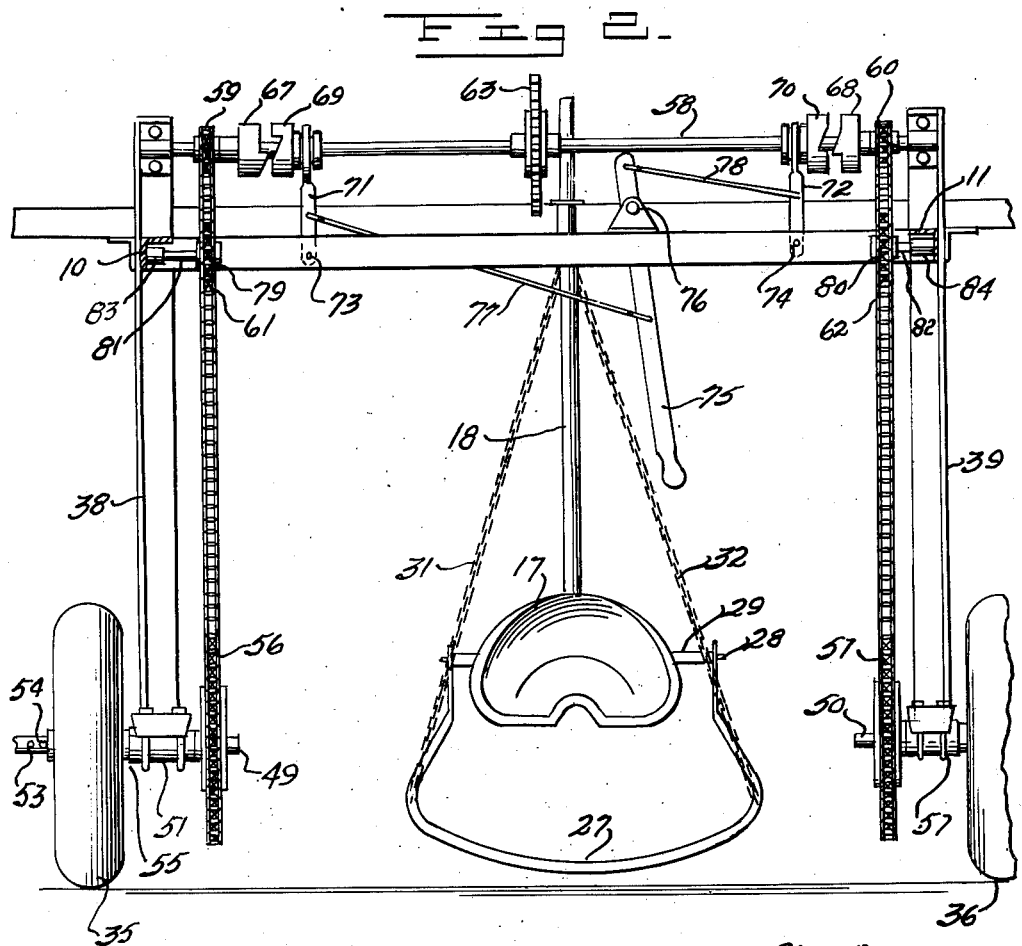
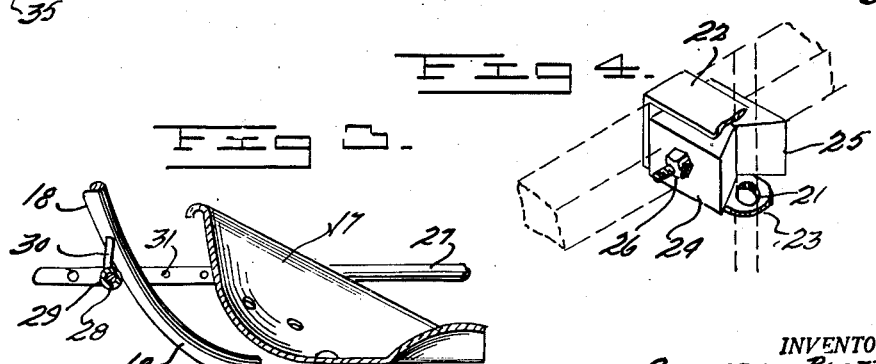
INVENTOR.
GARRETT PLATT
EMERSON PLATT
BY
ATTORNEYS Patented June 20, 1950

2,511,940

UNITED STATES PATENT OFFICE 2,511,940

FIELD CREEPER

Garrett Platt and Emerson Platt, Huston, Idaho

Application March 28, 1947, Serial No. 737,830

3 Claims. (Cl. 280—29)

This invention relates to farm implements of the type carrying a plurality of laborers in spaced relation for planting, weeding, or cultivating a plurality of parallel rows, and in particular, a plurality of laborer-carrying cradles suspended from a chassis or frame mounted on wheels positioned to travel between rows and provided with propelling means.

The purpose of this invention is to provide a self-propelled vehicle in the form of a creeper by which a plurality of laborers may be carried along parallel rows for planting, weeding, and the like.

In planting and weeding rows of small plants, such as lettuce, beets, carrots, and the like, it is necessary to manually work the rows continuously, and in order to plant rows of small plants or remove weeds from the rows, it is necessary for the planter or weeder to bend over and work substantially in a kneeling position. With this thought in mind, this invention contemplates a plurality of traveling seats with supporting foot rests, wherein planters and weeders may be carried in close proximity to the ground, and work in comfort.

The object of this invention is, therefore, to provide a self-propelled traveling or creeping farm implement adapted to suspend a plurality of workers over a plurality of parallel rows and continuously move the workers down the rows.

In row crop farming, such as in planting, cultivating, weeding, thinning, and harvesting, it is desirable to convey a plurality of persons, with one person over each row, along the rows, and as the persons may be of different sizes, or may have different characteristics, wherein each may be more efficient at a different elevation from the ground, it is desirable to adjust the supporting elements from the frame of the machine independently. For this reason, the creeper of this invention includes independently suspended cradles, wherein the seat of each cradle and also the foot rest thereof may be adjusted independently. Another object of the invention is to provide a conveying device for carrying a plurality of workers along rows of a field, wherein the distance between the supporting wheels may be adjusted to compensate for rows of different widths.

The time required for planting and weeding, and particularly weeding of different plants, varies from time to time, and, therefore, a further object of the invention is to provide in a machine for carrying a plurality of workers along rows in a field, means for adjusting the traveling speed of the vehicle.

Another object of the invention is to provide means in a farm implement for carrying a plurality of laborers along rows in a field, for setting the wheels of the implement, wherein ridges between the rows will guide the implement along the rows.

A further object of the invention is to provide a field creeper for conveying a plurality of laborers along parallel rows in a field which is of a simple and economical construction.

With these and other objects in view, the invention embodies a substantially horizontal frame suspended by wheels and supports above the surface of the ground with self-propelling means associated with the wheels, steering means, and a plurality of cradles suspended from the frame with the elevation of the cradles independently adjustable.

Other features and advantages of the invention will appear from the following description taken in connection with the drawings, wherein:

Figure 1 is a view showing a side elevation of the machine with the parts shown in their relative positions.

Figure 2 is a view showing a cross-section through the machine looking toward the rear, taken on line 2—2 of Figure 1.

Figure 3 is a detail showing a cross-section through one of the seats of the creeper, illustrating the adjustable mounting means therefor.

Figure 4 is a detail showing one of the cradle-supporting clamps illustrating the clamping blocks by which the elevation of the cradles may be adjusted.

Referring now to the drawings, wherein like reference characters indicate corresponding parts, the laborer-carrying farm implement of this invention includes a frame having longitudinally extending side beams 10 and 11 with transversely disposed beams 12 and 13 at the front connected at the ends by beams 14 and 15, and a beam 16 at the rear by which a centrally disposed cradle at the rear is supported.

The laborer-carrying cradles of this invention include seats 17 attached to the lower ends of arcuate struts 18, the upper portions of which are provided with vertically disposed posts 19 that extend through openings 20 and 21 in outwardly extending arms 22 and 23 of U-shaped brackets slidably mounted on the transverse beams 12, 13 and 16 of the frame. The posts 19 are secured in the brackets by blocks 24 and 25 which are locked in clamping relation with the posts by bolts 26, as shown in Figure 4. With the posts clamped in the brackets in this manner, the elevation of the cradles may readily be adjusted independently through the clamping means.

The cradles are provided with foot rests formed by hoop-shaped bars 27, the ends of which are pivotally mounted on transverse bars 28, as illustrated in Figures 1 and 3. The bars 28 are provided with sleeves 29 having upwardly extending arms 30 that are permanently attached by welding, or the like, to the members 18, as shown in Figure 3. The bars 28 extend through openings 31 in the ends of the bars 27, and the distance of the foot rests from the seats may be adjusted by locating the bolts 28 in different openings. The outer ends of the foot rests are suspended by chains 31 and 32 from upper, outwardly extending ends 33 of the struts 18 and the elevation of the bars may also be adjusted by catching different links of the chains in the holding elements 34 of the ends 33. The elevation of the seats and foot rests of the cradles may, therefore, be adjusted, and the spaces between the cradles may also be adjusted by sliding the brackets formed by the arms 22 and 23 on the transverse members of the frame.

The frame is supported from wheels 35, 36 and 37 by vertically disposed posts 38 and 39 at the rear and a yoke 40 at the front which is pivotally mounted through discs 41 and 42 at the lower end of a centrally disposed strut 43. The front wheel is also provided with a handle 44 having a cross-bar 45 and a bracket 46 by which it may be held in the upright position, as shown in Figure 1, from the forward end of the frame. The lower end of the handle is attached by a yoke 47 to the axle 48 of the front wheel in the lower ends of the arms of the yoke 40.

The rear wheels 35 and 36 are mounted on axles 49 and 50 which are rotatably mounted in bearings 51 and 52 at the lower ends of the vertically disposed struts 38 and 39, and the outer ends of the shafts are extended and provided with opening 53, wherein the wheels may be adjustably positioned on the shafts and held by pins 54 and spacing collars 55. The length of the collars 55 may be changed to correspond with changes in the width of rows over which the device travels, and the pins 54 may be changed accordingly. The elements 53, 54 and 55 are the same in both sides of the machine, and the same reference numerals are used for all. The shafts 49 and 50 are provided with sprockets 56 and 57 by which the shafts are rotated from a jack shaft 58 through sprockets 59 and 60 and chains 61 and 62. The jack shaft 58 is provided with a sprocket 63 through which it is rotated by a chain 64 from a sprocket 65 on a motor 66, as illustrated in Figure 1. The sprockets 59 and 60 may be provided with clutch elements 67 and 68 adapted to coact with sliding clutch elements 69 and 70 slidable on the shaft and actuated by clutch levers 71 and 72 pivotally mounted in the frame on pins 73 and 74 and actuated by a lever 75 pivotally mounted on a pin 76 through bars 77 and 78. With the parts arranged in this manner, an operator on the seat 17 at the rear of the creeper may operate the clutch elements through the element 75. It will be understood that other transmission elements may be used in place of the sprockets and chains, and with the parts arranged as shown the forward strands of the chains 61 and 62 are held outward by idlers 79 and 80 on inwardly extending shafts 81 and 82 which are mounted in bearings 83 and 84 in the side members 10 and 11 of the horizontally positioned frame.

In the farm implement as disclosed and described herein which provides a field creeper by which a plurality of laborers may be carried across a field with one laborer over each of a plurality of spaced rows, and with the laborers suspended in this manner, the direction of travel of the vehicle set, and with the speed of the vehicle adjusted to compensate for the work desired to be accomplished by the laborers, plants may be inserted in the ground, or plants may be thinned or weeded, and the relative positions of the laborers may be adjusted, wherein they may work efficiently and in comfort. The design of the frame, the means for adjustably supporting the seats and foot rests of the cradles, and the manner in which the machine is assembled provide maximum flexibility in adjustment of the parts for the work desired.

It will be understood that modifications may be made in the design and arrangement of the parts without departing from the spirit of the invention.

We claim:

1. In a field creeper including a wheeled frame and means for propelling the frame over a plurality of rows of a field, the improvement comprising a combined seat and foot rest carried by said frame for each of said rows, each seat including an arcuate strut including a substantially horizontal leg and an integral depending leg, means on one end of said horizontal leg and operatively connected to said frame, a seat carried by said vertical leg in downwardly-spaced relation to said horizontal leg, a foot rest pivoted on said vertical leg in the region of said seat and extending forwardly thereof, means comprising at least one flexible member operatively connecting said foot rest to the other end of said horizontal leg of said strut for vertically adjusting said foot rest relative to said seat.

2. In a field creeper including a wheeled frame and means for propelling the frame over a plurality of rows of a field, the improvement comprising a combined seat and foot rest carried by said frame for each of said rows, each seat including an arcuate strut including a substantially horizontal leg and an integral depending leg, means on one end of said horizontal leg and operatively connected to said frame, a seat carried by said vertical leg in downwardly-spaced relation to said horizontal leg, said vertical leg including a lower portion providing a pair of laterally oppositely-directed and axially-aligned sleeves, a rod pivoted in each sleeve and including a free outer end extending axially outwardly thereof, a pair of forwardly-directed bars each including front and rear ends, said rear ends being formed with a plurality of longitudinally-spaced transverse apertures therethrough, said apertures being adapted to receive said free outer ends of said rods therein whereby to pivotally and adjustably connect said bars to said vertical leg of said strut, an arcuate cross-piece rigidly connecting said forward ends of said bars forwardly of said seat and providing a foot rest, and means operatively connecting said foot rest to the other end of said horizontal leg for raising and lowering said foot rest whereby to adjust the same vertically.

3. In a field creeper including a wheeled frame and means for propelling the frame over a plurality of rows of a field, the improvement comprising a combined seat and foot rest carried by said frame for each of said rows, each seat including an arcuate strut including a substantially horizontal leg and an integral depending leg, means on one end of said horizontal leg and operatively connected to said frame, a seat carried by said vertical leg in downwardly-spaced relation to said horizontal leg, said vertical leg including a lower portion providing a pair of laterally oppositely-directed and axially-aligned sleeves, a rod pivoted in each sleeve and including a free outer end extending axially outwardly thereof, a pair of forwardly-directed bars each including front and rear ends, said rear ends being formed with a plurality of longitudinally-spaced transverse apertures therethrough, said apertures being adapted to receive said free outer ends of said rods therein whereby to pivotally and adjustably connect said bars to said vertical leg of said strut, an arcuate crosspiece rigidly connecting said forward ends of said bars forwardly of said seat and providing a foot rest, a chain connecting said foot rest to the other end of said horizontal leg of said strut, and means for varying the lengths of said chain whereby to adjust said foot rest vertically.

GARRETT PLATT.
EMERSON PLATT.

REFERENCES CITED

The following references are of record in the file of this patent:

UNITED STATES PATENTS

| Number | Name | Date |
|---|---|---|
| 667,370 | Sowder | Feb. 5, 1901 |
| 764,447 | Franek | July 5, 1904 |
| 1,756,803 | Williams | Apr. 29, 1930 |
| 2,163,851 | Pfister | June 27, 1939 |
| 2,378,143 | Jensen | June 12, 1945 |